United States Patent
Tsai et al.

(10) Patent No.: US 9,195,556 B2
(45) Date of Patent: Nov. 24, 2015

(54) HOST DEVICE AND METHOD FOR TESTING BOOTING OF SERVERS

(71) Applicant: HON HAI PRECISION INDUSTRY CO., LTD., New Taipei (TW)

(72) Inventors: Ming-Shang Tsai, New Taipei (TW); Cheng-Yu Tsai, New Taipei (TW); Chung-Lun Hsu, New Taipei (TW); Ho-Cheng Yang, New Taipei (TW); Jui-Kun Hsieh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 146 days.

(21) Appl. No.: 14/140,463

(22) Filed: Dec. 24, 2013

(65) Prior Publication Data
US 2015/0121142 A1   Apr. 30, 2015

(30) Foreign Application Priority Data
Oct. 31, 2013   (TW) .............................. 102139622 A

(51) Int. Cl.
G06F 11/00   (2006.01)
G06F 11/22   (2006.01)

(52) U.S. Cl.
CPC .... *G06F 11/2284* (2013.01); *G06F 2011/2278* (2013.01)

(58) Field of Classification Search
USPC ........................................ 714/36, 24
See application file for complete search history.

(56) References Cited

U.S. PATENT DOCUMENTS

| | | | |
|---|---|---|---|
| 2008/0098263 A1* | 4/2008 | Yen ................................ | 714/36 |
| 2009/0222652 A1* | 9/2009 | Khan et al. ...................... | 713/2 |
| 2011/0087874 A1* | 4/2011 | Timashev et al. ............. | 713/100 |
| 2014/0143601 A1* | 5/2014 | Chen .............................. | 714/36 |

* cited by examiner

*Primary Examiner* — Sarai Butler
(74) *Attorney, Agent, or Firm* — Novak Druce Connolly Bove + Quigg LLP

(57) ABSTRACT

In a method for testing a booting of servers, the servers are controlled to boot to perform a booting test, and are controlled to quit the booting test. A current state of the booting test is stored in a test log, if the booting of one of the servers is unsuccessful. A system log of each server is saved in the storage device if a first component list of each server is identical to the second component list of the server. The servers are controlled to quit the booting test, and a current state of the booting test is recorded in the test log if the component list of one of the servers is not identical to the second component list the server.

12 Claims, 5 Drawing Sheets

HOST DEVICE AND METHOD FOR TESTING BOOTING OF SERVERS

BACKGROUND

1. Technical Field

The embodiments of the present disclosure relate to a host device and a method for testing booting of servers.

2. Description of Related Art

In general, server manufacturers need to perform a booting test to verify quality of servers. The booting test is usually operated manually, which is time and labor consuming. In addition, some devices of the servers, such as CPU and storage system, may be lost or not be detected during the booting test, which may reflect an accuracy of the booting test and further reduce reliability of the servers.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, flash memory, and hard disk drives.

Figure 1:
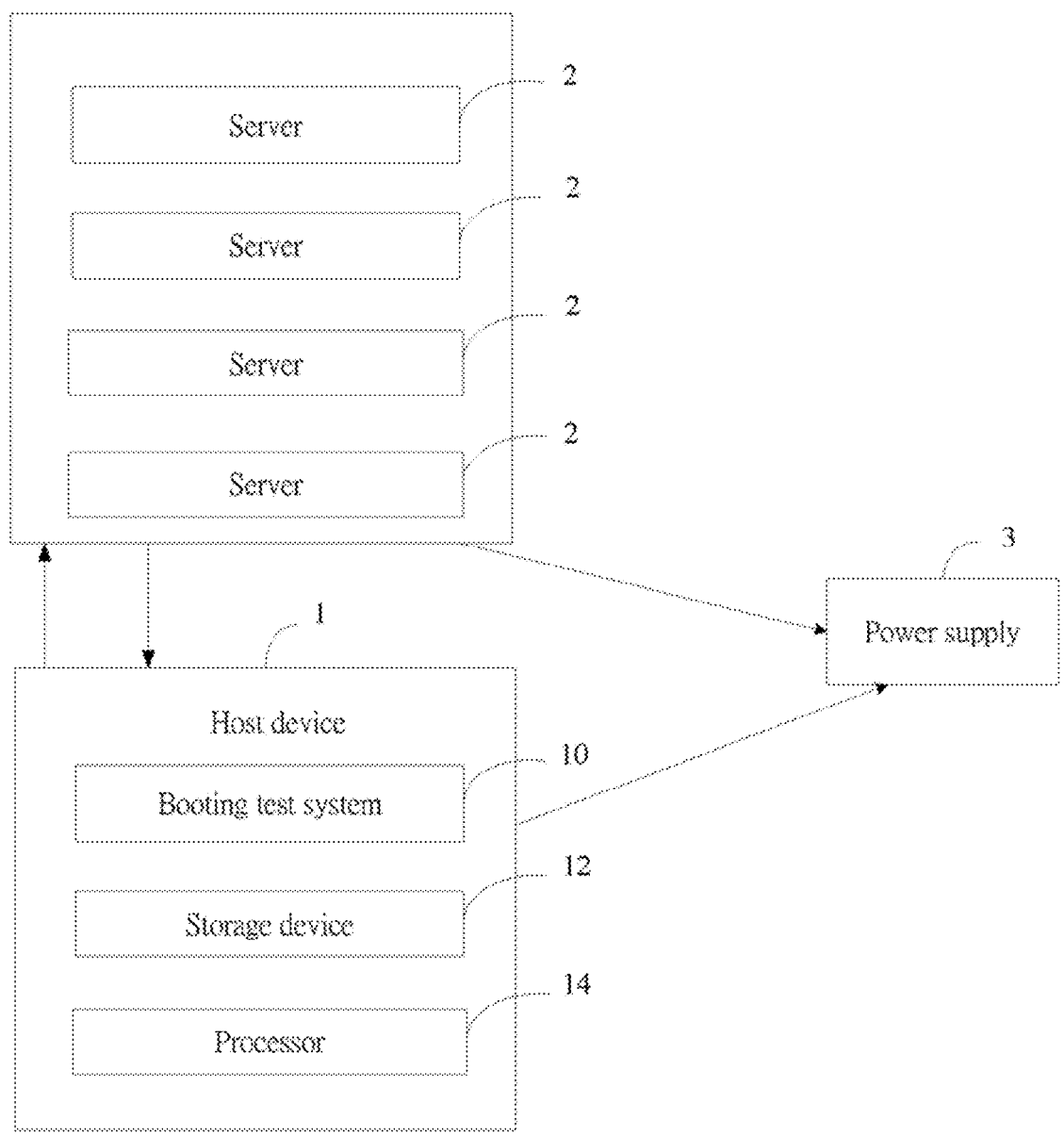
FIG. 1 is a block diagram of one embodiment of an host device including a booting test system.

FIG. 1 is a block diagram of one embodiment of a host device 1 including a booting test system 10, a storage device 12, and at least one processor 14. The host device 1 may be a desk computer, a notebook, a server, or other computer device. The host device 1 connects to a plurality of servers 2 and a power supply 3. The power supply 3 provides electric power for the servers 2.

In one embodiment, the storage device 12 (a non-transitory storage device) may be an internal storage system, such as a random access memory (RAM) for the temporary storage of information, and/or a read only memory (ROM) for the permanent storage of information. In some embodiments, the storage device 12 may be an external storage system, such as an external hard disk, a storage card, or a data storage medium.

The at least one processor 14 may include a processor unit, a microprocessor, an application-specific integrated circuit, and a field programmable gate array, for example.

In one embodiment, the booting test system 10 includes a plurality of function modules which include computerized codes or instructions that can be stored in the storage device 12 and executed by the at least one processor 14 to provide a method for testing the booting of the servers 2.

Figure 2:
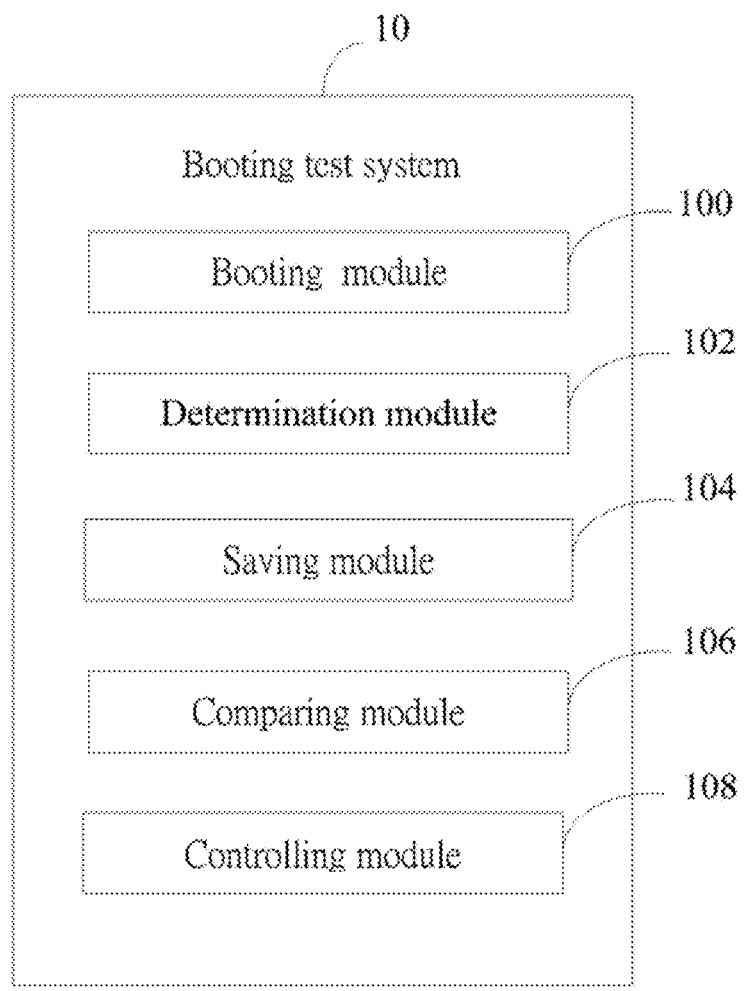
FIG. 2 is a block diagram of one embodiment of function modules of the booting test system in FIG. 1.

FIG. 2 is a block diagram of one embodiment of function modules of the booting test system 10 in FIG. 1. In the embodiment, the booting test system 10 includes a booting module 100, a determination module 102, a saving module 104, a comparing module 106, and a controlling module 108. The modules may comprise computerized codes in the form of one or more programs that are stored in the storage device 12 and executed by the at least one processor 14 to provide functions for implementing the booting test system 10. The functions of the function modules are illustrated in FIG. 3 and described below.

Figure 3:
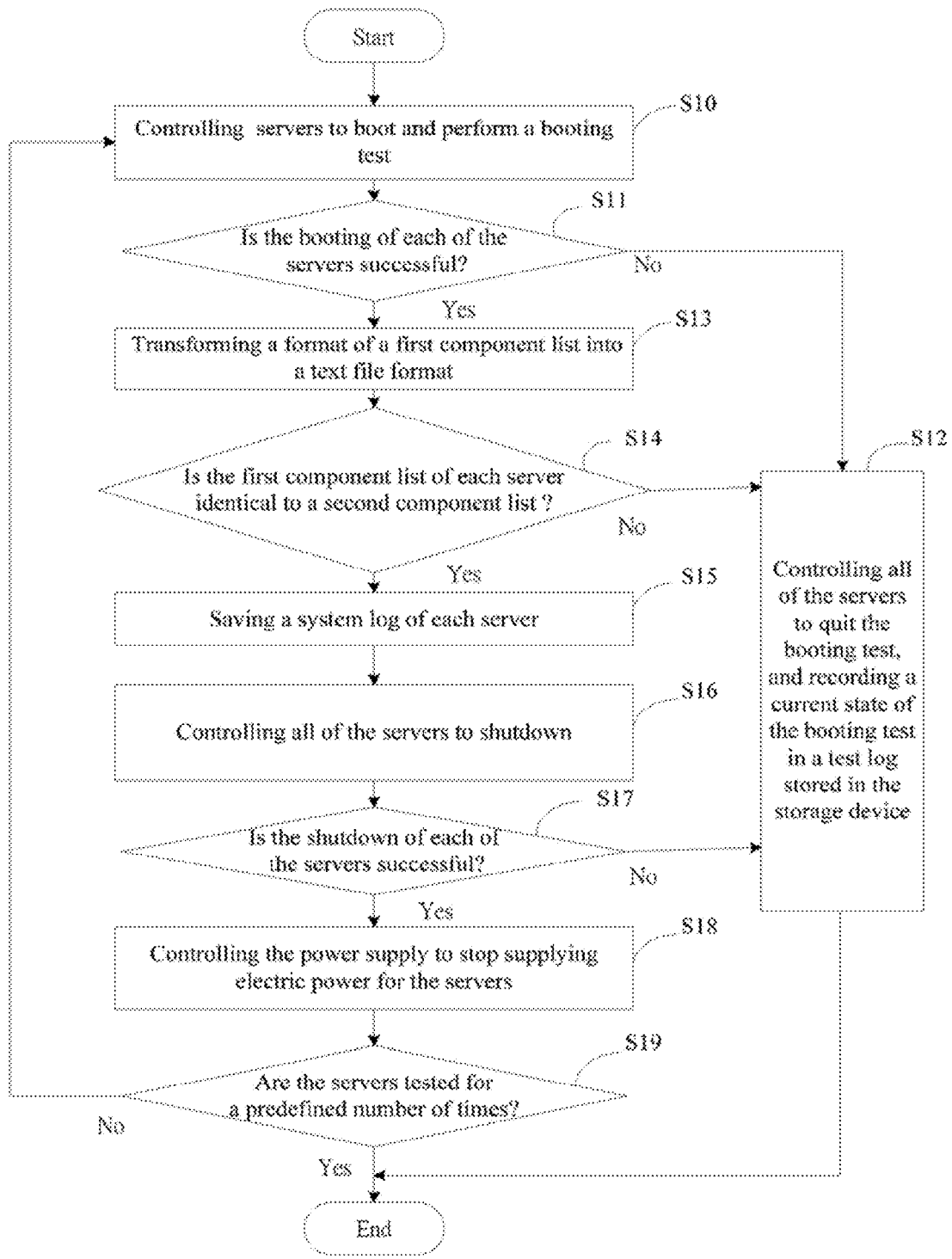
FIG. 3 is a flowchart of one embodiment of a method for testing booting of servers.

FIG. 3 is a flowchart illustrating one embodiment of a method for testing the booting of the servers 2. Depending on the embodiment, additional steps may be added, others removed, and the ordering of the steps may be changed.

In step S10, the booting module 100 controls the booting test

In step S11, the determination module 102 determines whether a booting of each of the servers 2 is successful. If the booting of each of the servers 2 is successful, S13 is implemented. Otherwise, if the booting of one of the servers 2 is unsuccessful, S12 is implemented. In the embodiment, each server 2 may send information to the host device 1 to inform the host device 1 that the booting of the server 2 is successful after the booting of the server 2. If the host device 1 receives the information from all of the servers 2, the determination module 102 determines the booting of all of the servers 2 is successful. Otherwise, if the host device 1 does not receive the information from one of the servers 2, the determination module 102 determines the booting of the server 2 is unsuccessful.

In step S12, the saving module 104 controls all of the servers 2 to quit the booting test, and records a current state of the booting test in a test log stored in the storage device 12. In the embodiment, the current state of the booting test may be that a CPU of one of the servers 2 is not detected during the booting test.

Figure 4:
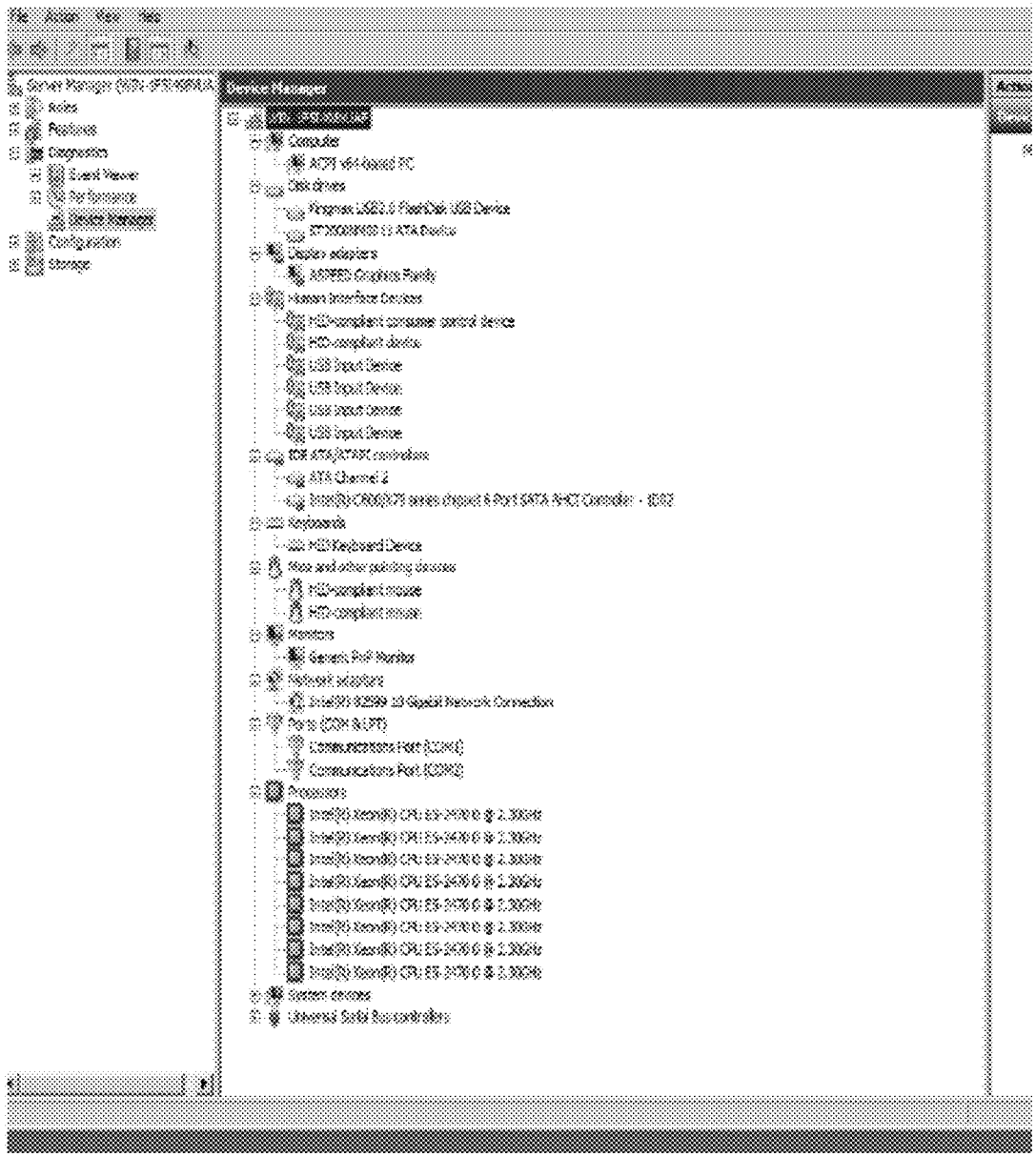
FIG. 4 is a diagram of one embodiment of a component list generated in a current booting of each server.
Figure 5:
FIG. 5 is a diagram of one embodiment of a text file format of the component list generated in the current booting of each server.

In step S13, the comparing module 106 transforms a format of a first component list (as shown in FIG. 4) into a text file format. As shown in FIG. 5, the first component list is generated in a current booting of each server 2, and is transformed into the text file format.

In step S14, the comparing module 106 determines whether the first component list of each server 2 is identical to the second component list generated during the last booting of the server 2. If the first component list of each server 2 is identical to the second component list generated during the last booting of the server 2, step S15 is implemented. Otherwise if the first component list of one of the servers 2 is not identical to the second component list generated during the last booting of the server 2, step S12 is repeated.

In step S15, the saving module 104 saves a system log of each server 2 in the storage device 12 of the host device 1. In the embodiment, the saving module 104 may name the system log of each server 2 with an IP address of the server 2, and deletes another system log of each server 2 saved during the last booting of the server 2.

In step S16, the controlling module 108 controls all of the servers 2 to shutdown.

In step S17, the determination 102 determines whether the shutdown of each of the servers 2 is successful. If the shutdown of each of the servers 2 is successful, S18 is implemented. Otherwise, if the shutdown of one of the servers 2 is unsuccessful, S12 is repeated. In the embodiment, the determination 102 may send a "pin" instruction to each server 2 to detect whether the shutdown of the server 2 is successful.

In step S18, the controlling module 108 controls the power supply 3 to stop supplying electric power for the servers 2.

In step S19, the controlling module 108 controls all of the servers 2 to quit the booting test if the servers 2 are tested for a predefined number of times. Otherwise, if the servers 2 are not tested for the predefined number of times, S10 is returned. For example, the predefined number of times may be defined as three times.

Finally, the test log and the system log can be checked during the booting test to determine whether the booting test of all of the servers 2 are successful.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A host device, comprising:
   at least one processor; and
   a storage device storing a computer program including instructions that, which executed by the at least one processor, causes the at least one processor to:
   control a power supply to supply electric power for servers, and control the servers to boot and perform a booting test;
   determine whether a booting of each of the servers is successful;
   control all of the servers to quit the booting test, and record a current state of the booting test in a test log stored in the storage device if the booting of one of the servers is unsuccessful;
   transform a format of a first component list generated in the current booting of each server into a text file format if the booting of each of the servers is successful;
   determine whether the first component lists of each server is identical to a second component list generated during a last booting of the server;
   save a system log of each server in the storage device if the first component list of each server is identical to the second component list of the server;
   control all of the servers to quit the booting test, and record a current state of the booting test in the test log stored in the storage device if the component list of one of the servers is not identical to the second component list the server;
   control the servers to shutdown;
   determine whether the shutdown of each of the servers is successful;
   control the power supply to stop supplying electric power for the servers if the shutdown of each of the server is successful;
   control all of the servers to quit the booting test, and record a current state of the booting test in the test log stored in the storage device if the shutdown of one of the servers is unsuccessful; and
   control the power supply to stop supplying electric power for the servers.

2. The host device claimed in claim 1, wherein the booting test of each of the servers is tested for a predefined number of times.

3. The host device claimed in claim 1, wherein the system log of each server is named with an IP address of the server.

4. The host device claimed in claim 1, wherein the computer program including instructions further causes the at least one processor to:
   delete the system log of each server saved in the storage device during the last booting of the server.

5. A method executable by a processor of a host device for testing booting of servers using a host device, the method comprising:
   controlling a power supply to supply electric power for the servers, and controlling the servers to boot and perform a booting test;
   determining whether a booting of each of the servers is successful;
   controlling all of the servers to quit the booting test, and recording a current state of the booting test in a test log stored in a storage device if the booting of one of the servers is unsuccessful;
   transforming a format of a first component list generated in the current booting of each server into a text file format if the booting of each of the servers is successful;
   determining whether the first component lists of each server is identical to a second component list generated during a last booting of the server;
   saving a system log of each server in the storage device if the first component list of each server is identical to the second component list of the server;
   controlling all of the servers to quit the booting test, and recording a current state of the booting test in the test log stored in the storage device if the component list of one of the servers is not identical to the second component list the server;
   controlling the servers to shutdown;
   determining whether the shutdown of each of the servers is successful;
   controlling the power supply to stop supplying electric power for the servers if the shutdown of each of the servers is successful;
   controlling all of the servers to quit the booting test, and record a current state of the booting test in the test log stored in the storage device if the shutdown of one of the servers is unsuccessful; and
   controlling the power supply to stop supplying electric power for the servers.

6. The method claimed in claim 5, wherein the booting test of each of the servers is tested for a predefined number of times.

7. The method claimed in claim 5, wherein the system log of each server is named with an IP address of the server.

8. The method claimed in claim 5, further comprising: deleting the system log of each server saved in the storage device during the last booting of the server.

9. A non-transitory computer-readable storage medium having stored thereon instructions being executed by a processor of a host device, causes the processor to perform a method for testing booting of servers, the method comprising:
   controlling a power supply to supply electric power for the servers, and controlling the servers to boot and perform a booting test;
   determining whether a booting of each of the servers is successful;

controlling all of the servers to quit the booting test, and recording a current state of the booting test in a test log stored in a storage device if the booting of one of the servers is unsuccessful;

transforming a format of a first component list generated in the current booting of each server into a text file format if the booting of each of the servers is successful;

determining whether the first component lists of each server is identical to a second component list generated during a last booting of the server;

saving a system log of each server in the storage device if the first component list of each server is identical to the second component list of the server;

controlling all of the servers to quit the booting test, and recording a current state of the booting test in the test log stored in the storage device if the component list of one of the servers is not identical to the second component list the server;

controlling the servers to shutdown;

determining whether the shutdown of each of the servers is successful;

controlling the power supply to stop supplying electric power for the servers if the shutdown of each of the servers is successful;

controlling all of the servers to quit the booting test, and record a current state of the booting test in the test log stored in the storage device if the shutdown of one of the servers is unsuccessful; and controlling the power supply to stop supplying electric power for the servers.

10. The storage medium claimed in claim 9, wherein the booting test of each of the servers is tested for a predefined number of times.

11. The storage medium claimed in claim 9, wherein the system log of each server is named with an IP address of the server.

12. The storage medium claimed in claim 9, wherein the method further comprising: deleting the system log of each server saved in the storage device during the last booting of the server.

* * * * *